(12) United States Patent
Han et al.

(10) Patent No.: US 9,449,131 B2
(45) Date of Patent: Sep. 20, 2016

(54) EXTRACTING SYSTEM ARCHITECTURE IN HIGH LEVEL SYNTHESIS

(71) Applicant: Xilinx, Inc., San Jose, CA (US)

(72) Inventors: Guoling Han, Fremont, CA (US); Stephen A. Neuendorffer, San Jose, CA (US)

(73) Assignee: XILINX, INC., San Jose, CA (US)

( * ) Notice: Subject to any disclaimer, the term of this patent is extended or adjusted under 35 U.S.C. 154(b) by 198 days.

(21) Appl. No.: 14/294,062

(22) Filed: Jun. 2, 2014

(65) Prior Publication Data

US 2015/0347654 A1 Dec. 3, 2015

(51) Int. Cl.
*G06F 17/50* (2006.01)
*G06F 9/45* (2006.01)

(52) U.S. Cl.
CPC .......... *G06F 17/5045* (2013.01); *G06F 8/433* (2013.01); *G06F 8/45* (2013.01); *G06F 8/452* (2013.01); *G06F 8/456* (2013.01); *G06F 17/505* (2013.01); *G06F 17/5054* (2013.01); *G06F 2217/86* (2013.01)

(58) Field of Classification Search
None
See application file for complete search history.

(56) References Cited

U.S. PATENT DOCUMENTS 5,603,043 A 2/1997 Taylor et al.
6,438,739 B1 * 8/2002 Yamada ............... G06F 17/5045
716/104
8,296,713 B2 * 10/2012 Ispir ...................... G06F 17/505
716/132
8,966,457 B2 * 2/2015 Ebcioglu ............. G06F 17/5045
716/105

FOREIGN PATENT DOCUMENTS

WO WO 94/10627 A1 5/1994

OTHER PUBLICATIONS

Datasheet, "Synphony C Compiler," Synopsys, Inc., Mar. 2014, 3 pages (available at https://www.synopsys.com/Tools/Implementation/RTLSynthesis/Pages/SynphonyC-Compiler.aspx).*
Moore et al., "A parallel for loop memory template for a high level synthesis compiler," 2010 13th Euromicro Conference on Digital System Design: Architectures, Methods and Tools, pp. 449-455.*
Xilinx, Inc., "Introduction to FPGA Design with Vivado High-Level Synthesis", User Guide, UG998 (v1.0), Jul. 2, 2013, pp. 1-89, http://www.xilinx.com/support/documentation/sw manual s/ug998-vivado-intor-fpga-design-hls.pdf, San Jose, CA USA.
Xilinx, Inc., "Vivado Design Suite User Guide High-Level Synthesis", User Guide, UG902 (v2014.1) May 30, 2014, 5 pages, http ://www.xilinx.com/support/documentation/sw manual s/xi l i nx2014 1/ug902-vivado-high-level -synthesis.pdf, San Jose, CA USA.

(Continued)

*Primary Examiner* — Leigh Garbowski
(74) *Attorney, Agent, or Firm* — Kevin T. Cuenot (57) ABSTRACT

Extracting a system architecture in high level synthesis includes determining a first function of a high level programming language description and a second function contained within a control flow construct of the high level programming description. The second function is determined to be a data consuming function of the first function. Within a circuit design, a port including a local memory is automatically generated. The port couples a first circuit block implementation of the first function to a second circuit block implementation of the second function within the circuit design.

17 Claims, 7 Drawing Sheets

(56) References Cited

OTHER PUBLICATIONS

Canis, Andrew, et al., "From Software to Accelerators with LegUp High-Level Synthesis", 2013 International Conference on Compilers, Architecture and Synthesis for Embedded Systems (CASES), Sep. 1, 2013, pp. 1-9.

Chinnadurai, M., et al., "High Level Synthesis Tools-an Overview from Model to Implementation", Middle-East Journal of Scientific Research, Feb. 1, 2014, pp. 241-254.

Meeus, Wim et al., "An overview of today's high level synthesis tools", Design Automation for Embedded Systems, vol. 16, No. 3, Aug. 21, 2012, pp. 31-51.

Johnson, D., "Programming a Xilinx FPGA in 'C'," [online] Xcell Journal, The Quarterly Journal for Programmable Logic Users, Issue 34, 4th Qtr, 1999, pp. 26-30, retrieved from the Internet: http://www.xilinx.com/publications/archives/xcell/Xcell34.pdf.

\* cited by examiner

```
705
function A(stream<int> &inputA, stream<int> &outputA);
function B1(stream<int> &inputB1, stream<int> &outputB1);
function B2(stream<int> &inputB2, stream<int> &outputB2;
function C(stream<int> &inputC, stream<int> &outputC);

function A(inputA, outputA);
for(int i=0; i<M; ++i)
{
   function B1(outputA, outputB1);
   function B2(outputB1, outputB2);
}
function C(outputB2, outputC);
```

FIG. 7

```
805
void producer (int A[N])
{
   for(int i=0; i<N; ++i)
      A[i] = ...
} void consumer(int A[N], ...)
{
   for(int i=0; i<N; ++i)
      ... = A[i] ...;
}
```

EXTRACTING SYSTEM ARCHITECTURE IN HIGH LEVEL SYNTHESIS

FIELD OF THE INVENTION

This disclosure relates to integrated circuits (ICs) and, more particularly, to extracting a system architecture for a circuit design during high level synthesis.

BACKGROUND

High-level synthesis is an automated design process that creates a circuit design from a high level programming language description of an electronic system. The high level programming language description of the electronic system is an algorithmic description. Examples of high level programming languages include, but are not limited to, C, C++, SystemC, and the like. An electronic design automation (EDA) tool operates on the high level programming language description and generates the circuit design. The circuit design may be a register-transfer level hardware description of the electronic system specified using a hardware description language (HDL).

During high level synthesis, one objective is to identify sequential portions of the high level programming language description where parallelism may be introduced. When incorporated into the circuit design, parallelism provides improved resource usage and improved system performance in the resulting circuitry. Many high level programming language descriptions are iterative in nature and utilize complex, programming language constructs such as loops, arrays, and the like. Extracting a dataflow architecture from a high level programming language description having such complex constructs is difficult and not ordinarily performed.

SUMMARY

A method includes determining a first function of a high level programming language description and a second function contained within a control flow construct of the high level programming description, determining that the second function is a data consuming function of the first function, and automatically generating, within a circuit design and using a processor, a port including a local memory. The port couples a first circuit block implementation of the first function to a second circuit block implementation of the second function within the circuit design.

A system includes a processor programmed to initiate executable operations. The executable operations include determining a first function of a high level programming language description and a second function contained within a control flow construct of the high level programming description, determining that the second function is a data consuming function of the first function, and automatically generating, within a circuit design, a port including a local memory. The port couples a first circuit block implementation of the first function to a second circuit block implementation of the second function within the circuit design.

A non-transitory computer-readable storage medium includes instructions stored thereon. The instructions, when executed by a processor, perform a method. The method includes determining a first function of a high level programming language description and a second function contained within a control flow construct of the high level programming description, determining that the second function is a data consuming function of the first function, and automatically generating, within a circuit design, a port including a local memory. The port couples a first circuit block implementation of the first function to a second circuit block implementation of the second function within the circuit design.

Other features will be recognized from consideration of the Detailed Description and Claims, which follow.

BRIEF DESCRIPTION OF THE DRAWINGS

FIGS. 3-1 and 3-2 are block diagrams illustrating the automatic creation of a circuit design from a description of an electronic system.

FIGS. 4-1 and 4-2 are block diagrams illustrating the automatic creation of another circuit design from a description of an electronic system.

DETAILED DESCRIPTION OF THE DRAWINGS

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to extracting a system architecture for a circuit design during high level synthesis. In accordance with the inventive arrangements described within this disclosure, a high level programming language description of an electronic system is processed to generate a circuit design for the electronic system. The high level programming language description is an algorithmic description that may include any of a variety of control flow constructs such as non-nested loops, arrays, conditional control structures, and the like. The control flow constructs are processed by incorporating control circuitry that facilitates data-dependent timing behavior. The data dependent timing behavior of the circuit design is controlled and/or synchronized among the various circuit blocks that are generated using control signals that may be generated by the control circuitry.

The resulting circuit design is a hardware description of the electronic system. The circuit design may be specified using a hardware description language. Further, the circuit design supports multiple, concurrent executions of a large body of the program code of the original high level programming language description of the electronic system.

In one aspect, the inventive arrangements described herein may be implemented as a method or process performed by a data processing system. In another aspect, the inventive arrangements may be implemented as a data processing system having a processor that is programmed to execute and/or initiate executable operations that generate a circuit design as described herein. In still another aspect, the inventive arrangements may be implemented as a non-transitory computer-readable storage medium storing program code that, when executed, causes a processor and/or a system to perform a method or process.

Several definitions that apply throughout this document are presented. As defined herein, the term "automatically" means without user intervention. As defined herein, the term "user" means a human being.

As defined herein, the term "high level programming language" means a set of instructions used to describe a data processing system, e.g., an electronic system, where the instructions typically have a strong abstraction from the details of the described system. A high level programming language may hide aspects of operation of the described system such as memory management or machine instructions and may enable a program, written in the high level programming language, to be transformed into a variety of systems. When using a high level programming language, the user may, but need not, explicitly describe the registers, memory addresses, machine instructions, etc. of the system to be generated from the program. Examples of high level programming languages include, but are not limited to, C, C++, SystemC, or the like. In some cases, the instruction set of a particular data processing system may be considered a "high level programming language" when transformed into a program expressed in the instruction set of an alternate, or different, data processing system.

As defined herein, the term "control flow construct" means one or more statements or instructions of a high level programming language whose execution results in a choice being made as to which of two or more different dataflow paths are followed. A control flow construct is not the same as a function. An example of a control flow construct is a conditional branch. A conditional branch refers to the case where statements are executed only when a condition is met or are executed until a condition is met. Conditional branches include loop constructs, for-next constructs, do-until constructs, if-then constructs, if-then-else constructs, and the like.

As defined herein, the term "hardware description language" is a computer-language that facilitates the documentation, design, and implementation of a digital system. The implementation of the digital system may include the transformation of the digital system into a set of masks for IC manufacturing, the programming of a programmable IC such as a field programmable gate array (FPGA), or the like. Using an HDL, for example, a user can design and specify an electronic circuit, describe the operation of the circuit, and create tests to verify operation of the circuit. An HDL includes standard, text-based expressions of the spatial and temporal structure and behavior of the digital system being modeled. HDL syntax and semantics include explicit notations for expressing concurrent operations in a digital system and synchronizing the progress of concurrent operations to achieve a particular combined behavior. In many circuits, this synchronization is based on a globally visible signal called a "clock." It should be appreciated, however, that other mechanisms for synchronization between portions of a circuit may be provided.

As defined herein, the term "handshaking" or "handshake signaling" means a type of control signaling that may include the establishment of synchronization or providing of notifications between sending and receiving equipment, e.g., circuits, by means of exchanging specific character configurations and/or signals. Handshaking may be implemented using a set of signals in relation to a clock signal, or may be implemented using a set of signals independent of a clock signal (e.g. "two-phase handshake"), or may be implemented using the exchange of data packets or messages through a protocol combining a set of more primitive synchronizations and communications.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
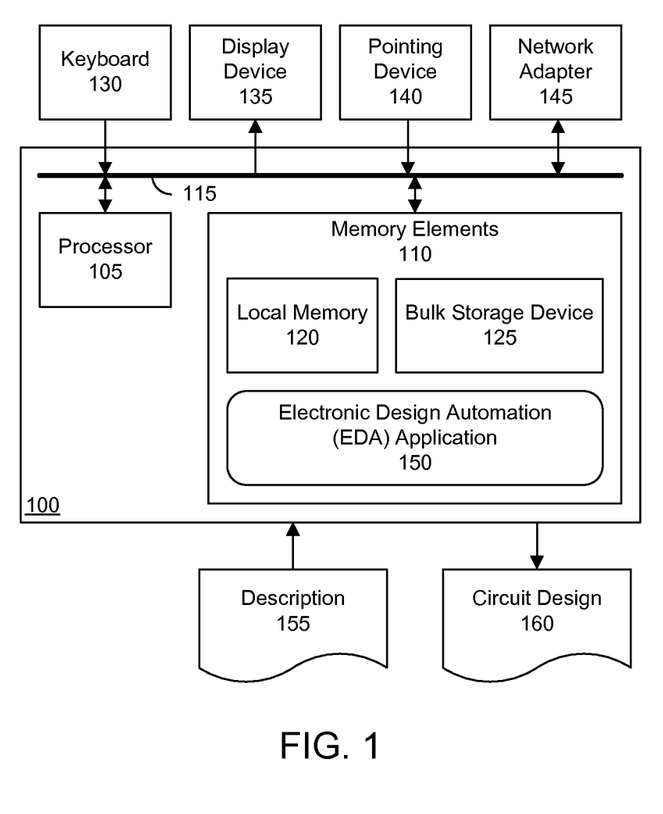
FIG. 1 is a block diagram illustrating an exemplary data processing system.

FIG. 1 is a block diagram illustrating an exemplary data processing system (system) 100. System 100 includes at least one processor, e.g., a central processing unit (CPU), 105 coupled to memory elements 110 through a system bus 115 or other suitable circuitry. System 100 stores program code within memory elements 110. Processor 105 executes the program code accessed from memory elements 110 via system bus 115. In one aspect, system 100 is implemented as a computer that is suitable for storing and/or executing program code. It should be appreciated, however, that system 100 may be implemented in the form of any system including a processor and memory that is capable of performing the functions described within this specification.

Memory elements 110 include one or more physical memory devices such as, for example, local memory 120 and one or more bulk storage devices 125. Local memory 120 refers to random access memory (RAM) or other non-persistent memory device(s) generally used during actual execution of the program code. Bulk storage device(s) 125 can be implemented as a hard disk drive (HDD), a solid state drive (SSD), or other persistent data storage device. System 100 also may include one or more cache memories (not shown) that provide temporary storage of at least some program code in order to reduce the number of times program code must be retrieved from bulk storage device 125 during execution.

Input/output (I/O) devices such as a keyboard 130, a display device 135, and a pointing device 140 optionally may be coupled to system 100. The I/O devices may be coupled to system 100 either directly or through intervening I/O controllers. A network adapter 145 also may be coupled to system 100 to enable system 100 to become coupled to other systems, computer systems, remote printers, and/or remote storage devices through intervening private or public networks. Modems, cable modems, Ethernet cards, and wireless transceivers are examples of different types of network adapter 145 that may be used with system 100.

As pictured in FIG. 1, memory elements 110 store an electronic design automation (EDA) application 150. EDA application 150, being implemented in the form of executable program code, is executed by system 100. As such, EDA application 150 is considered an integral part of system 100. EDA application 150 operates upon a received high level programming language description 155 of an electronic system under development. For purposes of clarity and discussion, high level programming language description 155 is referred to as "description" 155 or a "description" of an electronic system. Description 155, being specified using a high level programming language, is an algorithmic description of the electronic system. Description 155 does not specify particular hardware to be used.

EDA application 150 operates upon algorithmic description 155 and generates a circuit design 160 for the electronic system. Circuit design 160 is a hardware description of the electronic system specified by description 155. Circuit design 160 may be specified as a register transfer level hardware description written or specified in an HDL.

EDA application 150 and any data items, including description 155 and/or circuit design 160, are functional data structures that impart functionality when employed as part of system 100 or when further processed for implementation within an IC, whether a programmable IC, an application-specific IC, a partially programmable IC, or an IC that is not programmable.

Figure 2:
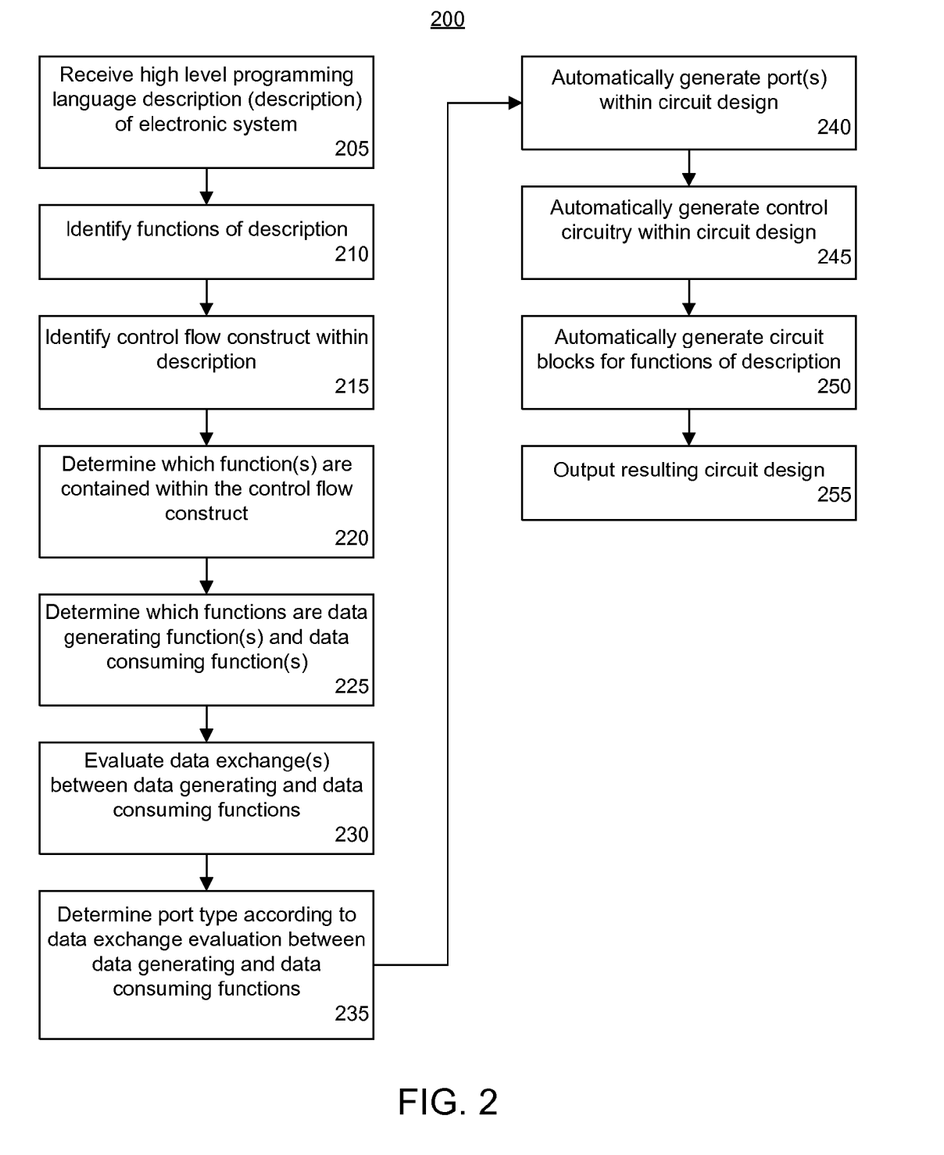
FIG. 2 is a flow chart illustrating an exemplary method of creating a circuit design from a high level programming language description (description) of an electronic system.

FIG. 2 is a flow chart illustrating an exemplary method 200 of creating a circuit design from a description of an electronic system. Method 200 may be performed by a system such as system 100 of FIG. 1. For purposes of illustration, method 200 is described as processing one control flow construct. It should be appreciated, however, that method 200 may be performed iteratively to process further control flow constructs that may be identified within the description or otherwise adapted to process multiple control flow constructs identified within the description.

In block 205, the system receives a description of an electronic system for processing. The description is specified in a high level programming language. Further, the description includes a control flow construct. In block 210, the system identifies functions specified within the description.

In block 215, the system identifies a control flow construct within the description. In block 220, the system determines which function, or functions as the case may be, are contained within the control flow construct. Within this specification, a function contained within the control flow construct is referred to as a "target function." A function is contained within the control flow construct when execution of the control flow construct determines whether the target function is or is not executed and/or a number of times (iterations) the target function is executed.

In block 225, the system determines which of the functions of the description, including any target functions, are data generating functions and which are data consuming functions. As defined herein, the term "data generating function" means a function of the description that generates or outputs data that is used as input by another function, which may or may not be the target function. As defined herein, the term "data consuming function" means a function of the description that receives, as input, data generated or output by another function, which may or may not be the target function. The system identifies data generating function and data consuming function relationships. A given function may operate as a data generating function with respect to one function and a data consuming function with respect to another, different function.

In block 230, the system evaluates data exchange(s) between data generating and data consuming functions of the description. For example, the system evaluates data exchanges between the target function and a data generating function providing input to the target function. The system further may evaluate data exchanges between the target function and a data consuming function that receives output from the target function.

Since each function is transformed into a circuit block, the resulting circuit blocks are coupled by ports. As defined herein, a "port" refers to circuitry or a hardware description of circuitry, e.g., wires, memory, interfaces, etc., that couple two or more circuit blocks thereby enabling the circuit blocks to exchange signals and/or data. The type of the port used to couple a circuit block created for a data generating function with a circuit block created for the data consuming circuit block is determined from the evaluation of the data exchange occurring between the data generating function and the data consuming function.

The system may determine one or more attributes of the data exchange. In one aspect, the system may detect a compiler directive included in the description of the electronic system that indicates a type of data exchange performed between a function and the target function. For example, within the description, a "pragma" or "# pragma" directive may be found that is associated with a particular function thereby specifying a type of data exchange. A directive, when detected in association with a target function, for example, may indicate a type of port that is to be used when creating the circuit design. Attributes of the data exchange(s) also may include a type of the data that is exchanged as defined within the high level programming language of the description.

In another aspect, the system may analyze inputs to the function, outputs from the function, and/or determine a sequential order in which input data items are processed and/or output data items are generated. The system may determine whether data generated by a data generating function, for example, is consumed by a data consuming function in the same sequential order as generated by the data generating function. Similarly, the system may determine whether data generated by a data generating function is consumed by a data consuming function in a different sequential order than generated by the data generating function.

In block 235, the system determines a port type according to the evaluation of the data exchange(s) between data generating and data consuming functions. In one or more aspects, the system may determine the port type according to detected a compiler directive(s) or a data type that is exchanged. In another aspect, the system determines the port type according to the data exchange and, more particularly, the sequential order in which data is generated compared to the sequential order in which the data is later consumed.

For example, when data is consumed in a same sequential order as generated, the port may be implemented using a first-in-first-out (FIFO) memory. Use of a FIFO memory means that the port is implemented as a self-synchronized port. A data exchange where data is consumed in a different order than generated may be implemented as a self-synchronized port or as a non-self-synchronized port. When data is consumed in a different order than generated, however, a FIFO memory may not be used. Instead, a local memory is used in implementing the port.

For purposes of explanation and clarity, circuit blocks, circuitry, or circuits generated for functions are referred to using similar terminology. For example, the circuit block generated for a data generator generating function may be referred to as the data generating circuit block. The circuit block generated for the target function may be referred to as the target circuit block. Similarly, the circuit block generated for the data consuming function may be referred to as the data consuming circuit block.

In general, ports, whether self-synchronized or non-self-synchronized, utilize block-level handshaking. A self-synchronized port allows data to arrive at a data consuming circuit block after the data consuming circuit block has started processing. This ability requires additional handshake signaling beyond block-level handshake signaling. A data consuming circuit block may complete a block-level start handshake and begin processing a portion of data before, for example, a memory contains data. As additional data is generated and placed into the memory, the data consuming circuit block may complete the additional handshake signaling to remove this data from the memory and process the data. Similarly a data generating circuit block may complete handshake signaling to place data in the memory prior to completing processing. The data generating circuit block may later complete a block level done handshake.

An example of a self-synchronized port is a streaming interface. One example of a streaming interface is an Advanced eXtensible Interface (AXI) protocol compliant streaming port sometimes referred to as an "AXI-stream." In one aspect, a streaming interface includes a FIFO memory. In that case, the self-synchronized port adheres to a FIFO data transfer scheme. In another aspect, a streaming interface may include a local memory. In the case of a local memory, the self-synchronized port may access data out of order, i.e., not in FIFO order, or in accordance with a FIFO data transfer scheme. In either case, however, the self-synchronized port includes handshake signaling beyond that of block-level handshake signaling such as handshake signaling performed between the data consuming and/or data generating circuit block(s) and the particular memory that is used.

As noted, a non-self-synchronized port utilizes block-level handshake signaling. Block-level handshake signaling means that the data consuming and/or data generating circuit blocks perform handshake signaling among themselves without performing handshake signaling with the particular memory involved in the data transfer. A data consuming circuit block may complete a block-level start handshake and access data in a local memory without completing additional handshake signaling, e.g., with the memory. A data generating circuit block may access data in the local memory without completing handshake signaling and then perform block-level done handshake signaling. In the case of a non-self-synchronized port, all data that is to be provided to a data consuming circuit block must be prepared and available to the data consuming circuit block prior to the start of processing of the data consuming circuit block.

A non-self-synchronized port includes a local memory with address and data signals. The circuit structure allows data to be read in a different order than stored. Exemplary local memories that may be used to implement either a self-synchronized port or a non-self-synchronized port include, but are not limited to, a lookup table (LUT) random access memory, a block random access memory, flip-flops, etc. A memory external to the IC in which the electronic system is to be implemented may also be used as a "local memory."

In block 240, the system automatically generates ports within the circuit design. Each port couples a data generating circuit block and a data consuming circuit block and is implemented as the type determined in block 235. Accordingly, each port includes the appropriate memory type. Generating a circuit block or a port within the circuit design means that the system generates an HDL module specifying the circuit block, circuitry, or port as the case may be and includes the HDL within the circuit design. The hardware description modules, taken collectively, form the circuit design for the electronic system. Accordingly, within this disclosure, the terms "hardware description module," "circuit," "circuit block," "port," and/or "circuitry" may be used interchangeably from time to time.

In block 245, the system automatically generates control circuitry within the circuit design. The control circuitry may include a start control circuit and an end control circuit. The control circuitry, in effect, implements the control flow construct of the algorithmic description in hardware.

Depending upon whether the port(s) connecting a data generating function and a data consuming function with the target function are self-synchronized, the control circuitry is configured to generate the necessary control signals to effectuate the flow of data among the data generating, the target, and the data consuming circuit blocks in accordance with the control flow construct. The extent of the control signals is dictated, at least in part, by the type of port that is selected or determined for implementation and the type of detected control flow construct.

In one aspect, generating ports within the circuit design includes automatically generating memories for data transfer. For example, the system automatically inserts an addressable memory facilitating data transfer from the data generating circuit block to the target circuit block responsive to determining that data is consumed in a different order than generated. The system also may automatically insert an addressable memory facilitating data transfer from the target circuit block to the data consuming circuit block in like circumstances, e.g., different data generation order than data consumption order. In some cases, the memories may be segmented memories, e.g., ping-pong memories, that include multiple, independent regions that may be independently written or read.

In another example, the system automatically inserts a FIFO memory facilitating data transfer from the data generating circuit block to the target circuit block responsive to determining that the target circuit block consumes data in a same sequential order as generated by the data generating circuit block. The system also may automatically insert a FIFO memory facilitating data transfer from the target circuit block to the data consuming circuit block in like circumstances.

In block 250, the system automatically generates a circuit block for each function of the description. In block 255, the system outputs the resulting circuit design. The system, for example, stores the circuit design within a memory such as persistent storage device or the like.

Figure 31:
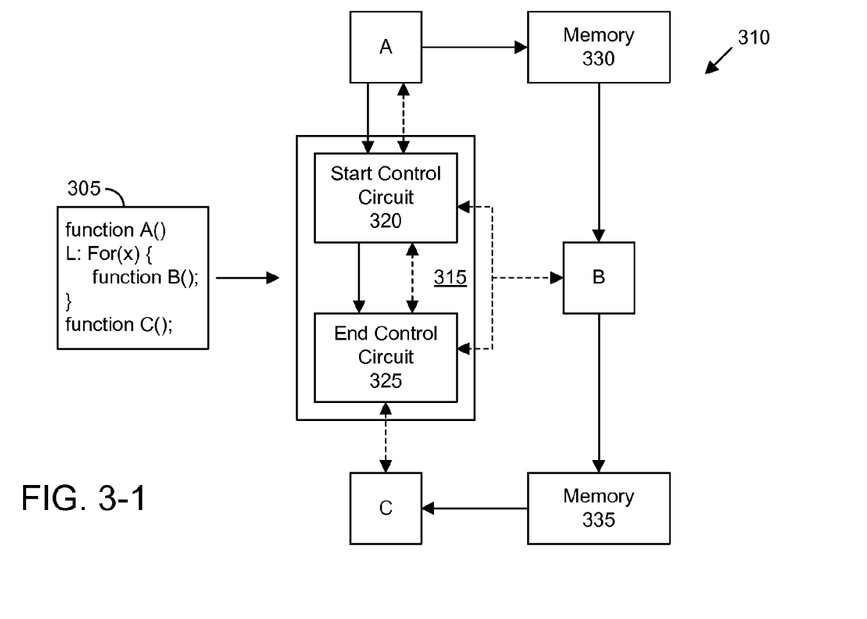
Figure 32:
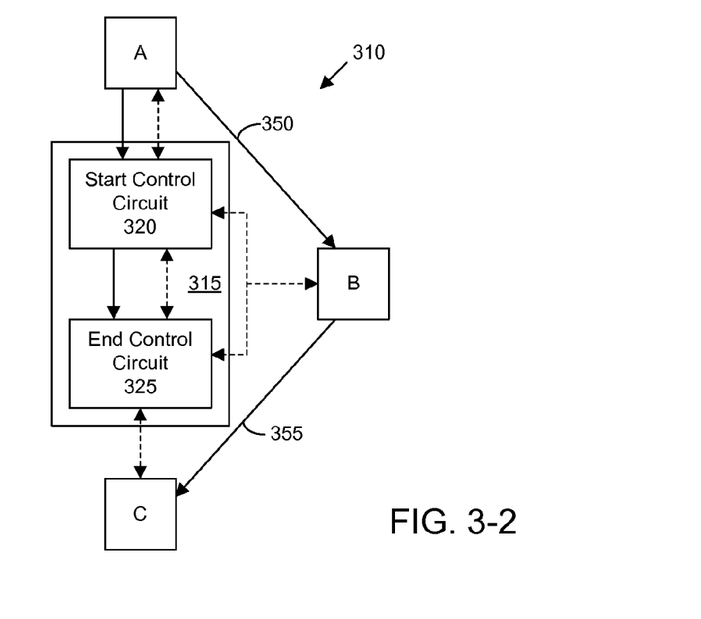

FIGS. 3-1 and 3-2 are block diagrams illustrating the automatic creation of a circuit design from a description of an electronic system. The process illustrated in FIGS. 3-1 and 3-2 may be implemented by the system of FIG. 1.

FIG. 3-1 shows a description 305 of an electronic system where non-self-synchronized ports are used to implement the circuit design. Description 305 includes three functions called function A, function B, and function C. In this example, description 305 includes a loop type of control flow construct. As pictured, function B is contained within the control flow construct and is the target function. As noted, a function contained within a control flow construct is a function in which execution of the function, whether conditional execution and/or the number of executions, is directly controlled by the control flow construct.

The system has generated a circuit design 310. Circuit design 310 is graphically illustrated. Each of functions A, B, and C is pictured in circuit design 310 as a block or circuit block having a label of A, B, and C, respectively. In addition to converting functions A, B, and C to circuit blocks, the system has automatically inserted control circuitry 315. In general, control circuitry 315 is a hardware implementation of the control flow construct identified in description 305. Control circuitry 315 includes a start control circuit 320 and an end control circuit 325.

As discussed, the system has determined that data exchange between function A and function B is implemented as non-self-synchronized ports. The system has inserted memory 330 to effectuate data transfer from circuit block A to circuit block B. Memory 330 is a RAM. The system also has inserted memory 335 to effectuate data transfer from circuit block B to circuit block C. Memory 335 is a RAM. In one aspect, any arrays specified in algorithmic description 305 are converted into two or more local memories, e.g., RAMs such as memories 330 and 335, accessible by particular circuit blocks. Access to each respective local memory, e.g., memories 330 and 335, is controlled or limited by handshake signaling performed, at least in part, by control circuitry 315.

Within FIGS. 3-6, data signal paths are illustrated using solid lines; and, control signals are represented by dotted or dashed lines. For example, the solid arrows from circuit block A to memory 330, to circuit block B, to memory 335, and circuit block C represent the flow of data among the noted circuit blocks. Data signal paths also exist between circuit block A and start control circuit 320 and between start control circuit 320 and end control circuit 325. The detection of the control flow construct within algorithmic description 305 results in the generation of control circuitry 315 that allows a larger number of tasks to be performed concurrently by circuit design 310. Circuit design 310 allows circuit blocks A, B, and C to operate simultaneously in a pipelined manner.

Within circuit design 310, loop control may be implemented as follows. In one aspect, circuit block A asserts a done control signal to start control circuit 320 to start iterations of loop processing including circuit block B. Circuit block A communicates an end condition for the loop, e.g., a loop bound, to start control circuit 320 over the data path, which in turn communicates the end condition to end control circuit 325 via the data path.

Start control circuit 320 may perform handshake signaling with circuit block B responsive to each start of execution of the loop body, i.e., circuit block B. Accordingly, start control circuit 320 may count the starts of execution of the loop body. Start control circuit 320 further may communicate the count to end control circuit 325 or notify end control circuit 325 when the number of execution starts reaches the end condition. End control circuit 325 further may perform handshake signaling with circuit block B responsive to each end of execution of the loop body. End control circuit 325 may count end of executions of the loop body and determine when the count of end of executions reaches the end condition.

End control circuit 325 performs handshake signaling with circuit block C responsive to both the start of execution count and the end of execution count reaching the loop bound. For example, responsive to both start control circuit 320 and end control circuit 325 reaching the loop bound or end condition, end control circuit 325 may assert a start control signal to circuit block C to end or complete the loop including circuit block B.

Regarding data flows, data generated by circuit block A, for example, is pushed into memory 330 when space is available. Depending upon the implementation of circuit design 310, the handshake signaling for data flow may be part of the control handshake signaling previously described or implemented as separate or additional wires.

Circuit block B reads data from memory 330 during each iteration of the loop. The data utilized by circuit block B remains in memory 330 until the last read of the data for the last execution of the loop is performed by circuit block B. In one aspect, start control circuit 320 and end control circuit 325 may perform handshake signaling with circuit block B indicating that circuit block B may remove the data no longer needed from memory 330 subsequent to completion of all loop body starts of execution. In other cases, the system may enable such handshake signaling earlier if the system determines that data stored in memory 330 is no longer needed by circuit block B.

Handshake signaling also must be performed by end control circuit 325 between circuit block B and circuit block C to indicate that circuit block C may consume, or read, data that is output by circuit block B to memory 335. The handshake signaling performed to inform circuit block C of the availability of data is performed responsive to completion of all executions of the loop body as described.

Memory 330 and memory 335 may be implemented using any of a variety of known physical memory devices. For example, memory 330 and memory 335 may be implemented using lookup table (LUT) RAM, block RAM, flip-flops, memory external to the IC in which circuit design 310 is implemented, or the like. Further, the number of storage locations, or size, of memories 330 and 335 will vary in accordance with requirements of description 305.

In another, alternative implementation, start control circuit 320 and end control circuit 325 may perform handshake signaling for each iteration of the loop. The last iteration of the loop may be indicated by a separate signal from start control circuit 320 to end control circuit 325. Responsive to the signal from start control circuit 320 indicating completion of the loop, end control circuit 325 may perform the necessary handshake signaling with circuit block C.

FIG. 3-2 shows an example where self-synchronized ports are used to implement the circuit design. In the example shown in FIG. 3-2, self-synchronized port 350 is implemented to pass data from circuit block A to circuit block B. Self-synchronized port 355 is implemented to pass data from circuit block B to circuit block C. In one aspect, self-synchronized port 350 and self-synchronized port 355 are implemented using FIFO memories. In another aspect, self-synchronized port 350 and self-synchronized port 355 are implemented using a local memory. In another aspect, one of self-synchronized ports 350 or 355 may be implemented using a FIFO memory while the other one of self-synchronized ports 350 or 355 is implemented using a local memory.

Figure 41:
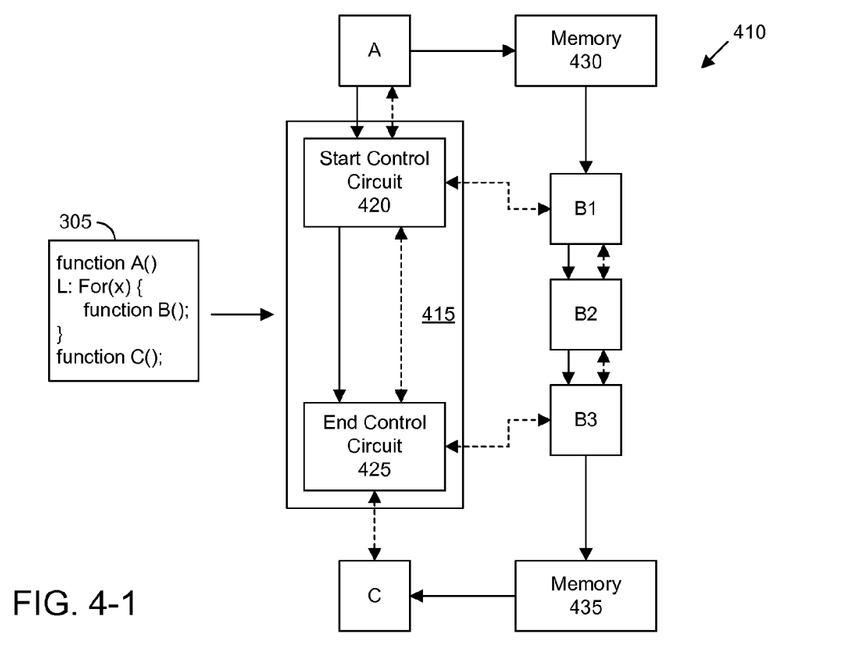
Figure 42:
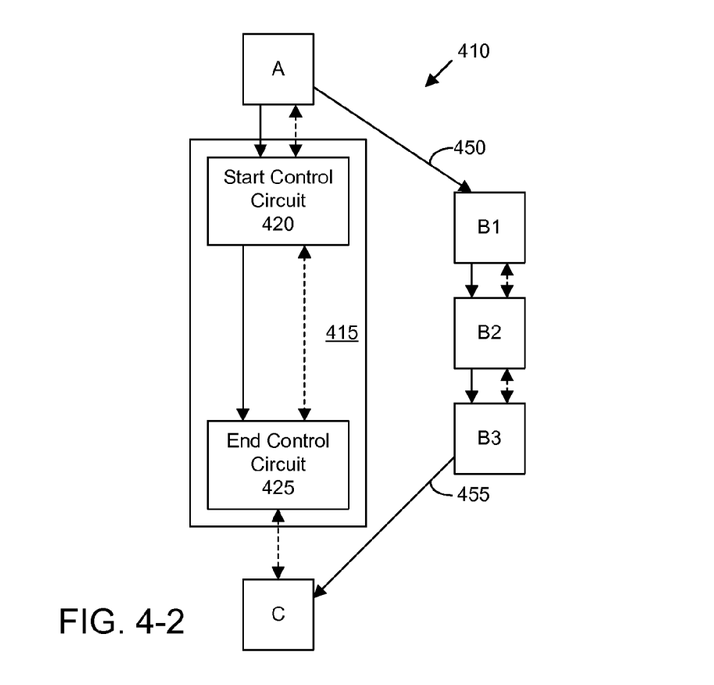

FIGS. 4-1 and 4-2 are block diagrams illustrating the automatic creation of another circuit design from a description of an electronic system. The process illustrated in FIGS. 4-1 and 4-2 may be implemented by the system of FIG. 1.

FIG. 4-1 shows description 305 of an electronic system where non-self-synchronized ports are used to implement the circuit design. FIG. 4 illustrates an alternative implementation where description 305 is converted into circuit design 410. Circuit design 410 is substantially similar to circuit design 310 of FIG. 3-1, with the exception that function B is implemented as a plurality of circuit blocks B1, B2, and B3 to facilitate additional pipelining. Accordingly, start control circuit 420 performs handshake signaling with circuit block B1. End control circuit 425 performs handshake signaling with circuit block B3. Handshake signaling also is implemented between circuit blocks B1 and B2 and between circuit blocks B2 and B3.

FIG. 4-2 shows an example where self-synchronized ports are used to implement the circuit design. In the example shown in FIG. 4-2, self-synchronized port 450 is implemented to pass data from circuit block A to circuit block B1. Self-synchronized port 455 is implemented to pass data from circuit block B3 to circuit block C. In one aspect, self-synchronized port 450 and self-synchronized port 455 are implemented using FIFO memories. In another aspect, self-synchronized port 450 and self-synchronized port 455 are implemented using local memories. In another aspect, one of self-synchronized ports 450 or 455 may be implemented using a FIFO memory while the other one of self-synchronized ports 450 or 455 is implemented using local memories.

Figure 5:
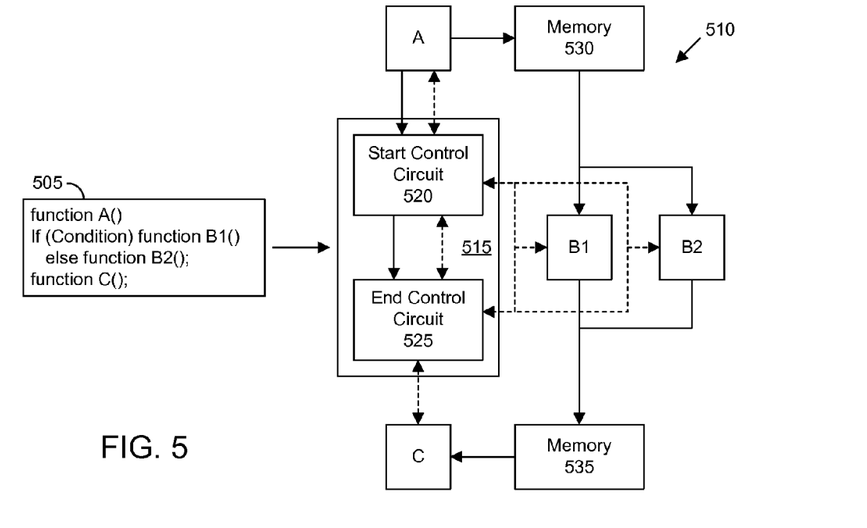
FIG. 5 is a block diagram illustrating the automatic creation of another circuit design from a description of an electronic system.

FIG. 5 is a block diagram illustrating the automatic creation of another circuit design from a description of an electronic system. The process illustrated in FIG. 5 may be implemented by the system of FIG. 1. FIG. 5 shows a description 505 of an electronic system. Description 505 includes four functions called function A, function B1, function B2, and function C. In this example, algorithmic description 505 includes an "If-then-else" type of control flow construct. As pictured, both functions B1 and B2 are contained within the control flow construct as mutually exclusive execution options.

The system has generated a circuit design 510. Circuit design 510 is graphically illustrated. Each of functions A, B1, B2, and C is pictured in circuit design 510 as a circuit or circuit block labelled A, B1, B2, and C, respectively. The system automatically inserts control circuitry 515. Control circuitry 515 is a hardware implementation of the "if-then-else" control flow construct identified in description 505. Control circuitry 515 includes a start control circuit 520 and an end control circuit 525.

In the example of FIG. 5, the system generates non-self-synchronized ports. The system further has inserted memory 530 to effectuate data transfer from circuit block A to either circuit block B1 or B2. The system also has inserted memory 535 to effectuate data transfer from either circuit block B1 or B2 to circuit block C. Access to each respective local memory, e.g., memories 530 and 535, is controlled or limited by handshake signaling performed by control circuitry 515. Memories 530 and 535 are RAM type memories.

For example, start control circuitry 520 may receive a done signal from circuit block A. Responsive to the done control signal, start control circuitry 520 may assert, or output, a start control signal to either circuit block B1 or circuit block B2 according to a condition of the control flow construct passed from circuit block A to start control circuit 520. End control circuit 525 may receive a done control signal from either circuit block B1 or B2, as the case may be, and in response thereto, assert or output a start control signal to circuit block C.

Figure 6:
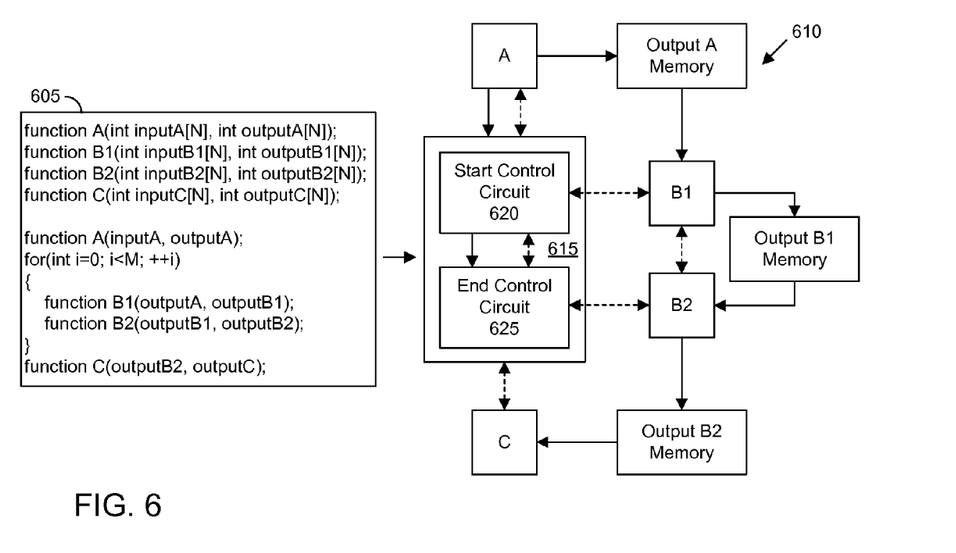
FIG. 6 is a block diagram illustrating the automatic creation of another circuit design from a description of an electronic system.

FIG. 6 is a block diagram illustrating the automatic creation of another circuit design from a description of an electronic system. The process illustrated in FIG. 6 may be implemented by the system of FIG. 1. FIG. 6 presents a more detailed illustration where the system generates circuit design 610 from description 605 and uses non-self-synchronized ports.

Within circuit design 610, the system determines that each of the inputs and outputs of the functions are implemented as memories. As shown, circuit design 610 includes an output A memory for outputA, an output B1 memory for outputB1, and an output B2 memory for outputB2. The memories providing data to circuit block A and receiving data from circuit block C are not shown for ease of illustration.

In the example of FIG. 6, each of output A memory, output B1 memory, and output B2 memory may be implemented as a ping-pong memory or memory having at least two separate storage regions to facilitate parallel or concurrent execution of circuit blocks for different data sets. For example, when circuit block A completes operations, the results may be stored in a first storage region of output A memory. Since function B receives "outputA" as input, circuit block A asserts a done control signal to start control circuit 620. The done control signal from circuit block A initiates execution of the loop including circuit blocks B1 and B2. Circuit block A may begin operating upon a next data set with results being stored in a second region of output A memory. Thus, circuit block B1 may continue to access the first region of output A memory while circuit block A writes to the second region of output A memory.

Start control circuit 620 begins loop execution by asserting a control signal to circuit block B1. Start control circuit 620 may continue starting new loop iterations until the loop exit condition is determined to be true. When circuit block B1 completes operations, the resulting data is stored in a first region of output B1 memory. Circuit block B1 further asserts a start signal control signal to circuit block B2. Circuit block B2 begins operation on the data stored in the first region of output B1 memory. Meanwhile, circuit block B1 may begin computations for a next iteration. If this is the last iteration of the loop, the start control logic may initiate a new loop start and block B1 can begin computation by retrieving a next data set from the second region of output A memory. Data generated by circuit block B1 is stored in the second region of output B1 memory.

When circuit block B1 and circuit block B2 finish all iterations for the loop, end control circuit 625 asserts a start control signal to circuit block C. Responsive to the start control signal from end control circuit 625, circuit block C obtains data for processing from output B2 memory.

Figure 7:
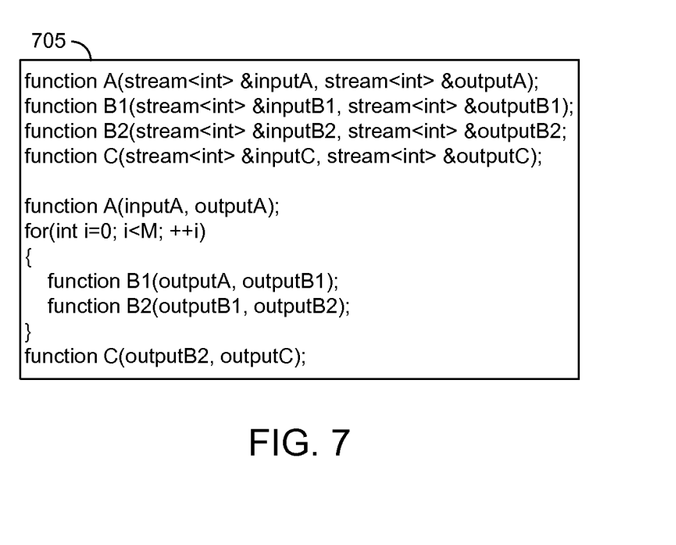
FIG. 7 illustrates an exemplary description of an electronic system that uses self-synchronized ports.

FIG. 7 illustrates an exemplary description 705 of an electronic system that uses self-synchronized ports. The data exchanged between functions A, B1, B2, and C, as declared within description 705, are communicated by stream data types. The system evaluates description 705 and determines, from the description itself and the use of stream data types, that self-synchronized ports may be used in the circuit design.

Figure 8:
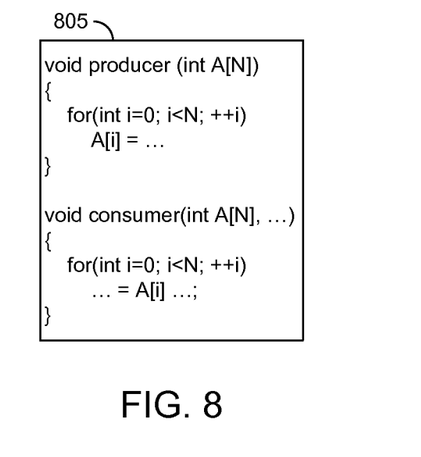
FIG. 8 illustrates another exemplary description of an electronic system that uses self-synchronized ports.

FIG. 8 illustrates another exemplary description 805 of an electronic system that uses self-synchronized ports. In the case of description 805, the system analyzes the producer function and finds that the data is generated in sequential order from index of 0 to N−1. The system further analyzes the consumer function and determines that data generated by the producer function is consumed in the same order as generated by the producer function. The system uses a FIFO memory since the system is able to prove, or determine, that the data generation order and the consumption order are same. In one aspect, when the system is unable to determine or prove that data is consumed in a same sequential order as generated, the system evaluates that condition to be the equivalent of a determination that data is not consumed in the same sequential order as generated.

Figure 9:
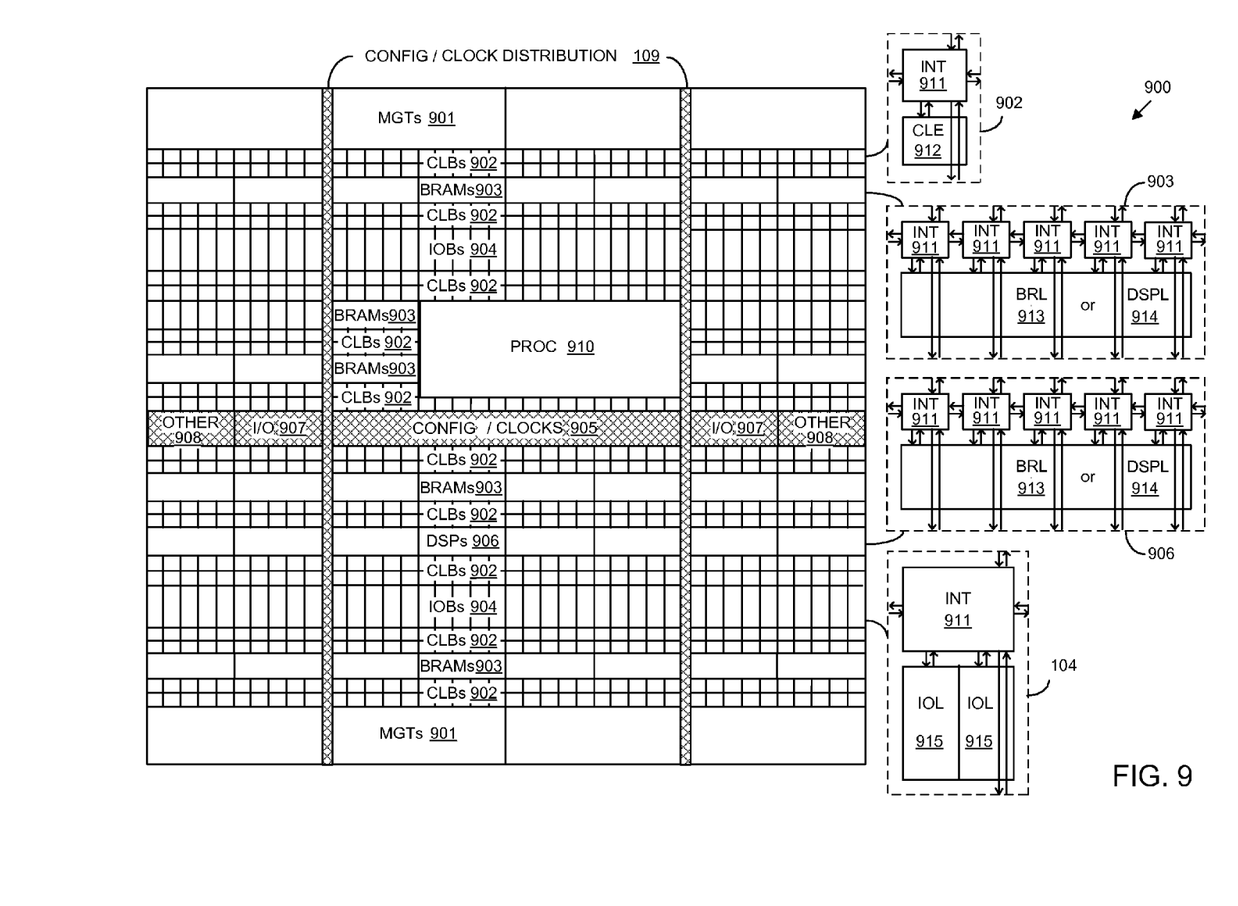
FIG. 9 is an exemplary architecture for an integrated circuit.

FIG. 9 is a block diagram illustrating an exemplary architecture 900 for an IC in accordance with an embodiment disclosed within this specification. Architecture 900 can be implemented within a field programmable gate array (FPGA) type of IC, for example. The various circuit designs described within this specification may be further processed, e.g., converted into a configuration bitstream, and loaded into an IC using architecture 900.

As shown, architecture 900 includes several different types of programmable circuit, e.g., logic, blocks. For example, architecture 900 can include a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized I/O blocks 907 (e.g., configuration ports and clock ports), and other programmable logic 908 such as digital clock managers, analog-to-digital converters, system monitoring logic, and so forth.

In some ICs, each programmable tile includes a programmable interconnect element (INT) 911 having standardized connections to and from a corresponding INT 911 in each adjacent tile. Therefore, the INTs 911, taken together, implement the programmable interconnect structure for the illustrated IC. Each INT 911 also includes the connections to and from the programmable logic element within the same tile, as shown by the examples included at the top of FIG. 9.

For example, a CLB 902 can include a configurable logic element (CLE) 912 that can be programmed to implement user logic plus a single INT 911. A BRAM 903 can include a BRAM logic element (BRL) 913 in addition to one or more INTs 911. Typically, the number of INTs 911 included in a tile depends on the height of the tile. In the pictured embodiment, a BRAM tile has the same height as five CLBs, but other numbers (e.g., four) can also be used. A DSP tile 906 can include a DSP logic element (DSPL) 914 in addition to an appropriate number of INTs 911. An IOB 904 can include, for example, two instances of an I/O logic element (IOL) 915 in addition to one instance of an INT 911. As will be clear to those of skill in the art, the actual I/O pads connected, for example, to IOL 915 typically are not confined to the area of IOL 915.

In the example pictured in FIG. 9, a columnar area near the center of the die, e.g., formed of regions 905, 907, and 908, can be used for configuration, clock, and other control logic. Horizontal areas 909 extending from this column are used to distribute the clocks and configuration signals across the breadth of the programmable IC.

Some ICs utilizing the architecture illustrated in FIG. 9 include additional logic blocks that disrupt the regular columnar structure making up a large part of the IC. The additional logic blocks can be programmable blocks and/or dedicated circuitry. For example, a processor block depicted as PROC 910 spans several columns of CLBs and BRAMs.

In one aspect, PROC 910 is implemented as a dedicated circuitry, e.g., as a hard-wired processor, that is fabricated as part of the die that implements the programmable circuitry of the IC. PROC 910 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 910 is omitted from architecture 900 and replaced with one or more of the other varieties of the programmable blocks described. Further, such blocks can be utilized to form a "soft processor" in that the various blocks of programmable circuitry can be used to form a processor that can execute program code as is the case with PROC 910.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 9 that are external to PROC 910 such as CLBs 902 and BRAMs 903 can be considered programmable circuitry of the IC.

In general, the functionality of programmable circuitry is not established until configuration data is loaded into the IC. A set of configuration bits can be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 910.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 9 is intended to illustrate an exemplary architecture that can be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 9 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of blocks such as PROC 910 within the IC are for purposes of illustration only and are not intended as a limitation of the one or more embodiments disclosed within this specification.

In accordance with the inventive arrangements disclosed herein, a description of an electronic system may be evaluated to identify control flow constructs. In generating a circuit design from the description, control circuitry is inserted into the circuit design that implements functionality of the control flow construct. The control circuitry performs function such as handshake signaling to increase parallelism, efficiently use resources, and increase of the resulting circuit design.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

The terms "a" and "an," as used herein, are defined as one or more than one. The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The term "and/or" as used herein refers to and encompasses any and all possible combinations of one or more of the associated listed items. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Within this disclosure, the same reference characters are used to refer to terminals, signal lines, wires, and their corresponding signals. In this regard, the terms "signal," "wire," "connection," "terminal," and "pin" may be used interchangeably, from time-to-time, within this disclosure. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

One or more aspects described within this disclosure can be realized in hardware or a combination of hardware and software. One or more aspects can be realized in a centralized fashion in one system or in a distributed fashion where different elements are spread across several interconnected systems. Any kind of data processing system or other apparatus adapted for carrying out at least a portion of the methods described herein is suited.

One or more aspects further can be embedded in a computer program product, which includes all the features enabling the implementation of the methods described herein. The computer program product includes a computer-readable data storage medium. As defined herein, the term "computer readable storage medium" means a storage medium that contains or stores program code for use by or in connection with an instruction execution system, apparatus, or device. A computer readable storage medium is non-transitory and, as such, is not a transitory propagating signal per se. Examples of a computer-readable storage medium may include, but are not limited to, optical media, magnetic media, magneto-optical media, computer memory such as random access memory, a bulk storage device, e.g., hard disk, or the like.

The flowchart and block diagrams in the Figures illustrate the architecture, functionality, and operation of possible implementations of systems, methods and computer program products according to various aspects of the inventive arrangements disclosed herein. In this regard, each block in the flowchart or block diagrams may represent a module, segment, or portion of code, which includes one or more executable instructions for implementing the specified logical function(s). It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, throughout this disclosure, statements utilizing terms such as "processing" or "computing" or "calculating" or "determining" or "displaying" or the like, refer to the action and processes of a data processing system, e.g., a computer system, or similar electronic computing device, that manipulates and transforms data represented as physical (electronic) quantities within the computer system's registers and/or memories into other data similarly represented as physical quantities within the computer system memories and/or registers or other such information storage, transmission or display devices.

The corresponding structures, materials, acts, and equivalents of all means or step plus function elements in the claims below are intended to include any structure, material, or act for performing the function in combination with other claimed elements as specifically claimed.

A method includes determining a first function of a high level programming language description and a second function contained within a control flow construct of the high level programming description, determining that the second function is a data consuming function of the first function, and automatically generating, within a circuit design and using a processor, a port including a local memory. The port couples a first circuit block implementation of the first function to a second circuit block implementation of the second function within the circuit design.

The method may include automatically generating, within the circuit design, control circuitry controlling operation of the second circuit block by performing handshake signaling between the first circuit block and the second circuit block as a non-self-synchronized port.

In one aspect, automatically generating control circuitry may include generating a start control circuit and an end control circuit implementing the flow control construct.

In another aspect, automatically generating control circuitry may include generating a start control circuit that, responsive to receiving a done control signal from the first circuit block, outputs a start control signal to the second circuit block or a third circuit block according to a condition of the control flow construct. An end control circuit may be generated that provides a start control signal to a fourth circuit block responsive receiving a done control signal from either the second circuit block or the third circuit block. The fourth circuit block is generated from a function that is a data consuming function of the second function or the third function.

In another aspect, automatically generating control circuitry may include generating a start control circuit that, responsive to receiving a done control signal from the first circuit block, outputs a start control signal to the second circuit block according to a condition of the control flow construct. An end control circuit may be generated that provides a start control signal to a third circuit block responsive to receiving a done control signal from the second circuit block. The third circuit block is generated from a third function that is a data consuming function of the second function.

In still another aspect, automatically generating control circuitry may include generating a start control circuit that, responsive to receiving a done control signal from the first circuit block, outputs a start control signal to the second circuit block. An end control circuit may be generated that provides a start control signal to a third circuit block responsive to determining that an end condition of the control flow construct is met. The third circuit block is generated from a third function that is a data consuming function of the second function.

The start control circuit may communicate the end condition of the flow control construct to the end control circuit. Further, the end control circuit may provide the start control signal to the third circuit block responsive to both the start control circuit and the end control circuit detecting the end condition.

A system includes a processor programmed to initiate executable operations. The executable operations include determining a first function of a high level programming language description and a second function contained within a control flow construct of the high level programming description, determining that the second function is a data consuming function of the first function, and automatically generating, within a circuit design, a port including a local memory. The port couples a first circuit block implementation of the first function to a second circuit block implementation of the second function within the circuit design.

The executable operations may include automatically generating, within the circuit design, control circuitry controlling operation of the second circuit block by performing handshake signaling between the first circuit block and the second circuit block as a non-self-synchronized port.

In one aspect, automatically generating control circuitry may include generating a start control circuit and an end control circuit implementing the flow control construct.

In another aspect, automatically generating control circuitry may include generating a start control circuit that, responsive to receiving a done control signal from the first circuit block, outputs a start control signal to the second circuit block or a third circuit block according to a condition of the control flow construct. An end control circuit may be generated that provides a start control signal to a fourth circuit block responsive receiving a done control signal from either the second circuit block or the third circuit block. The fourth circuit block is generated from a function that is a data consuming function of the second function or the third function.

In another aspect, automatically generating control circuitry includes generating a start control circuit that, responsive to receiving a done control signal from the first circuit block, outputs a start control signal to the second circuit block according to a condition of the control flow construct. An end control circuit may be generated that provides a start control signal to a third circuit block responsive to receiving a done control signal from the second circuit block. The third circuit block is generated from a third function that is a data consuming function of the second function.

In still another aspect, automatically generating control circuitry may include generating a start control circuit that, responsive to receiving a done control signal from the first circuit block, outputs a start control signal to the second circuit block. An end control circuit may be generated that provides a start control signal to a third circuit block responsive to determining that an end condition of the control flow construct is met. The third circuit block is generated from a third function that is a data consuming function of the second function.

The start control circuit may communicate the end condition of the flow control construct to the end control circuit. Further, the end control circuit may provide the start control signal to the third circuit block responsive to both the start control circuit and the end control circuit detecting the end condition.

A non-transitory computer-readable storage medium includes instructions stored thereon. The instructions, when executed by a processor, perform a method. The method includes determining a first function of a high level programming language description and a second function contained within a control flow construct of the high level programming description, determining that the second function is a data consuming function of the first function, and automatically generating, within a circuit design, a port including a local memory. The port couples a first circuit block implementation of the first function to a second circuit block implementation of the second function within the circuit design.

The method may include automatically generating, within the circuit design, control circuitry controlling operation of the second circuit block by performing handshake signaling between the first circuit block and the second circuit block as a non-self-synchronized port.

In one aspect, automatically generating control circuitry may include generating a start control circuit and an end control circuit implementing the flow control construct.

The start control circuit may communicate the end condition of the flow control construct to the end control circuit.

The features described within this disclosure can be embodied in other forms without departing from the spirit or essential attributes thereof. Accordingly, reference should be made to the following claims, rather than to the foregoing disclosure, as indicating the scope of such features and implementations.

What is claimed is:

1. A method, comprising:
   determining a first function of a high level programming language description and a second function contained within a control flow construct of the high level programming description;
   determining that the second function is a data consuming function of the first function;
   automatically generating, within a circuit design and using a processor, a port comprising a local memory, wherein the port couples a first circuit block implementation of the first function to a second circuit block implementation of the second function within the circuit design; and
   automatically generating, within the circuit design, control circuitry controlling operation of the second circuit block by performing handshake signaling between the first circuit block and the second circuit block as a non-self-synchronized port.

2. The method of claim 1, wherein automatically generating control circuitry comprises:
generating a start control circuit and an end control circuit implementing the flow control construct.

3. The method of claim 1, wherein automatically generating control circuitry comprises:
generating a start control circuit that, responsive to receiving a done control signal from the first circuit block, outputs a start control signal to the second circuit block or a third circuit block according to a condition of the control flow construct; and
generating an end control circuit that provides a start control signal to a fourth circuit block responsive receiving a done control signal from either the second circuit block or the third circuit block;
wherein the fourth circuit block is generated from a function that is a data consuming function of the second function or the third function.

4. The method of claim 1, wherein automatically generating control circuitry comprises:
generating a start control circuit that, responsive to receiving a done control signal from the first circuit block, outputs a start control signal to the second circuit block according to a condition of the control flow construct; and
generating an end control circuit that provides a start control signal to a third circuit block responsive to receiving a done control signal from the second circuit block;
wherein the third circuit block is generated from a third function that is a data consuming function of the second function.

5. The method of claim 1, wherein automatically generating control circuitry comprises:
generating a start control circuit that, responsive to receiving a done control signal from the first circuit block, outputs a start control signal to the second circuit block; and
generating an end control circuit that provides a start control signal to a third circuit block responsive to determining that an end condition of the control flow construct is met;
wherein the third circuit block is generated from a third function that is a data consuming function of the second function.

6. The method of claim 5, wherein the start control circuit communicates the end condition of the flow control construct to the end control circuit.

7. The method of claim 6, wherein the end control circuit provides the start control signal to the third circuit block responsive to both the start control circuit and the end control circuit detecting the end condition.

8. A system, comprising:
a processor programmed to initiate executable operations comprising:
determining a first function of a high level programming language description and a second function contained within a control flow construct of the high level programming description;
determining that the second function is a data consuming function of the first function;
automatically generating, within a circuit design, a port comprising a local memory;
wherein the port couples a first circuit block implementation of the first function to a second circuit block implementation of the second function within the circuit design; and
wherein the processor further initiates executable operations comprising:
automatically generating, within the circuit design, control circuitry controlling operation of the second circuit block by performing handshake signaling between the first circuit block and the second circuit block as a non-self-synchronized port.

9. The system of claim 8, wherein automatically generating control circuitry comprises:
generating a start control circuit and an end control circuit implementing the flow control construct.

10. The system of claim 8, wherein automatically generating control circuitry comprises:
generating a start control circuit that, responsive to receiving a done control signal from the first circuit block, outputs a start control signal to the second circuit block or a third circuit block according to a condition of the control flow construct; and
generating an end control circuit that provides a start control signal to a fourth circuit block responsive receiving a done control signal from either the second circuit block or the third circuit block;
wherein the fourth circuit block is generated from a function that is a data consuming function of the second function or the third function.

11. The system of claim 8, wherein automatically generating control circuitry comprises:
generating a start control circuit that, responsive to receiving a done control signal from the first circuit block, outputs a start control signal to the second circuit block according to a condition of the control flow construct; and
generating an end control circuit that provides a start control signal to a third circuit block responsive to receiving a done control signal from the second circuit block;
wherein the third circuit block is generated from a third function that is a data consuming function of the second function.

12. The system of claim 8, wherein automatically generating control circuitry comprises:
generating a start control circuit that, responsive to receiving a done control signal from the first circuit block, outputs a start control signal to the second circuit block; and
generating an end control circuit that provides a start control signal to a third circuit block responsive to determining that an end condition of the control flow construct is met;
wherein the third circuit block is generated from a third function that is a data consuming function of the second function.

13. The system of claim 12, wherein the start control circuit communicates the end condition of the flow control construct to the end control circuit.

14. The system of claim 13, wherein the end control circuit provides the start control signal to the third circuit block responsive to both the start control circuit and the end control circuit detecting the end condition.

15. A non-transitory computer-readable storage medium having instructions stored thereon which, when executed by a processor, perform a method comprising:

determining a first function of a high level programming language description and a second function contained within a control flow construct of the high level programming description;

determining that the second function is a data consuming function of the first function;

automatically generating, within a circuit design, a port comprising a local memory;

wherein the port couples a first circuit block implementation of the first function to a second circuit block implementation of the second function within the circuit design; and automatically generating, within the circuit design, control circuitry controlling operation of the second circuit block by performing handshake signaling between the first circuit block and the second circuit block as a non-self-synchronized port.

16. The non-transitory computer-readable storage medium of claim 15, wherein automatically generating control circuitry comprises:

generating a start control circuit and an end control circuit implementing the flow control construct.

17. The non-transitory computer-readable storage medium of claim 16, wherein the start control circuit communicates the end condition of the flow control construct to the end control circuit.

* * * * *